United States Patent [19]
Tsunoda et al.

[11] Patent Number: 5,453,888
[45] Date of Patent: Sep. 26, 1995

[54] SERVO SIGNAL NOISE SUPPRESSION IN A SECTORED SERVO SYSTEM BY SEPARATING USER DATA FROM SERVO DATA AND FILTERING EACH WITH A SPECIFIC FILTER

[75] Inventors: Masahiko Tsunoda; Hiroyuki Kanda, both of Tokyo, Japan

[73] Assignee: Kabushiki Kaisha Toshiba, Kawasaki, Japan

[21] Appl. No.: 182,370

[22] Filed: Jan. 18, 1994

Related U.S. Application Data

[63] Continuation of Ser. No. 793,734, Nov. 20, 1991, abandoned.

[30] Foreign Application Priority Data

Nov. 21, 1990 [JP] Japan .................................. 2-318400

[51] Int. Cl.⁶ .................................................. G11B 5/596
[52] U.S. Cl. ...................... 360/77.08; 360/65; 360/77.07
[58] Field of Search ................................ 360/77.08, 26, 360/77.07, 65; 369/60

[56] References Cited

U.S. PATENT DOCUMENTS

| | | | |
|---|---|---|---|
| 3,483,540 | 12/1969 | Damon | 360/26 |
| 3,778,787 | 12/1973 | Cannon | 360/26 |
| 3,864,741 | 2/1975 | Schwarz | 360/77.08 |
| 4,152,550 | 5/1979 | Takahashi et al. | 369/90 |
| 4,188,646 | 2/1980 | Sordello et al. | 360/77.08 |
| 4,297,737 | 10/1981 | Andresen et al. | 360/77.08 X |
| 5,021,910 | 6/1991 | Murakami | 360/77.07 X |
| 5,070,421 | 12/1991 | Sumiya et al. | 360/77.08 X |

FOREIGN PATENT DOCUMENTS 62-256202  11/1987  Japan .

Primary Examiner—W. R. Young
Assistant Examiner—James T. Wilson
Attorney, Agent, or Firm—Finnegan, Henderson, Farabow, Garrett & Dunner

[57] ABSTRACT

In a hard disk drive of a sector servo type, two low pass filters having different filter characteristics are used. One low pass filter has uniform group delay characteristics to accurately detect the peak positions of data read/written by a user without causing any peak shifts. The other low pass filter has attenuation characteristics representing a high degree of attenuation of signal components having frequencies higher than a predetermined frequency so as to accurately detect the amplitudes of burst data for positioning a magnetic head to the center of a destination cylinder by removing noise.

12 Claims, 8 Drawing Sheets

SERVO SIGNAL NOISE SUPPRESSION IN A SECTORED SERVO SYSTEM BY SEPARATING USER DATA FROM SERVO DATA AND FILTERING EACH WITH A SPECIFIC FILTER

This application is a continuation of application Ser. No. 07/793,734 filed Nov. 20, 1991, now abandoned.

BACKGROUND OF THE INVENTION

1. Field of the Invention

The present invention relates to a magnetic recording and reproducing apparatus which can improve precision in positioning of a magnetic head.

2. Description of the Related Art

In a conventional hard disk drive of a sector servo type, data tracks are concentrically arranged and used to record data on a magnetic disk as a recording medium. A data track is called a cylinder. Each cylinder has a plurality of sectors. Each sector has a servo area and a data area. In each servo area, servo data is recorded. In each data area, data to be read/written by a user is recorded. The data is referred to as host data. Servo data includes servo detection data for detecting a servo area, address code data for identifying a cylinder, and burst data for positioning a magnetic head to the center of the cylinder. Note that servo detection data has a signal pattern which does not exist in host data to be read/written from/in a data area by a user. As such a signal pattern, data with no inverse magnetization, i.e., continuous erase data, is recorded. In addition, burst data includes four bursts A, B, C, and D.

Burst data is recorded at a predetermined repetitive frequency to prevent a peak shift caused by waveform interference between adjacent reproduced signals or the like. Note that burst data recorded at a low frequency is easier to read. With a decrease in recording frequency, however, a burst pattern area in which burst data is recorded is increased, resulting in a decrease in data area. For this reason, when the minimum frequency of recording frequencies used to record host data is 1 f, the recording frequency for burst data is generally set to be ⅔ f. Note that f corresponds to 1 MHz to several 10 MHz.

In a conventional hard disk drive, data recorded on a magnetic disk is read out as an analog reproduced signal by a magnetic head and is amplified by a head amplifier. The amplified signal is further amplified by an AGC (automatic gain control) amplifier with a gain set by an AGC circuit. Since the amplified reproduced signal contains high-frequency noise, a low pass filter is used to remove the noise. Note that the cutoff frequency of this low pass filter is determined by the characteristics of a magnetic head and a magnetic disk to be used and the S/N (signal/noise) ratio of the overall hard disk drive.

In a hard disk drive, since data recorded in a data area has a wide range of frequency components, a low pass filter to which such data are input preferably has uniform group delay characteristics in its pass band. Note that the group delay characteristics correspond to phase characteristics, and indicate periods from the input of the low pass filter till the output of the low pass filter in each frequency component. In the low pass filter used in the hard disk drive, the group delay characteristics represent a delay amount of the peak position of a reproduced signal between the input and output of the low pass filter. The group delay characteristics are represented by a group delay time.

When the group delay characteristics of the low pass filter greatly vary in accordance with recording frequencies, data having a wide range of frequency components tends to cause a peak shift. More specifically, in burst data recorded at a predetermined repetitive frequency, magnetization inverse occurs at predetermined intervals, and the group delay time corresponding to the frequency is constant. Therefore, the peak positions of reproduced signals uniformly change (delay), and the peak positions of adjacent reproduced signals do not come close to each other. However, as described above, since data recorded in a data area has a wide range of frequency components, magnetization inverse does not occur at predetermined intervals, and the group delay time changes depending on recording frequencies. For this reason, the peak positions of reproduced signals variously change (delay) in accordance with recording frequencies. As a result, the peak positions of adjacent reproduced signals may come close to each other, resulting in a peak shift. For the reasons described above, a low pass filter is required to have uniform group delay characteristics.

With regard to burst data, the amplitude of a reproduced signal needs to be accurately detected. If, however, high-frequency noise is contained in the reproduced signal, since its amplitude cannot be accurately detected, a positional shift from the center of a cylinder cannot be accurately obtained. Therefore, it is difficult to accurately position the magnetic head to the center of the cylinder.

Under the circumstances, in a hard disk drive of a sector servo type, it is demanded that precision in positioning of a magnetic head be improved by accurately detecting the amplitude of burst data while keeping constant with the delay of each peak position of data recorded in a data area.

SUMMARY OF THE INVENTION

It is an object of the present invention to provide a magnetic recording and reproducing apparatus which can improve precision in positioning of a magnetic head.

According to the present invention, there is provided a hard disk drive comprising: a recording medium on which information including host data and servo data is recorded, the servo data having burst data; head means for reading out a reproduced signal corresponding to the information recorded on the recording medium; first filter means for filtering the reproduced signal, the first filter means having uniform group delay characteristics within a predetermined frequency range, and attenuation characteristics attenuating frequency components having frequencies higher than a predetermined frequency; second filter means for filtering the reproduced signal, the second filter means having attenuation characteristics representing a higher degree of attenuation than the attenuation characteristics of the first filter means; means for detecting a peak position of the reproduced signal filtered by the first filter means; and means for detecting an amplitude of the reproduced signal filtered by the second filter means.

In addition, according to the present invention, there is provided a method of positioning of a magnetic head in a hard disk drive, the method comprising the steps of: reading out a reproduced signal from a recording medium on which host data and servo data are recorded, the servo data having burst data; filtering the read reproduced signal by using a first filter having attenuation characteristics representing a higher degree of attenuation of frequency components than a second filter having attenuation characteristics attenuating frequency components having frequencies higher than a predetermined frequency and uniform group delay characteristics within a predetermined frequency range; and detecting an amplitude of the reproduced signal filtered by the first filter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

An embodiment of the present invention will be described below with reference to the accompanying drawings.

Figure 1:
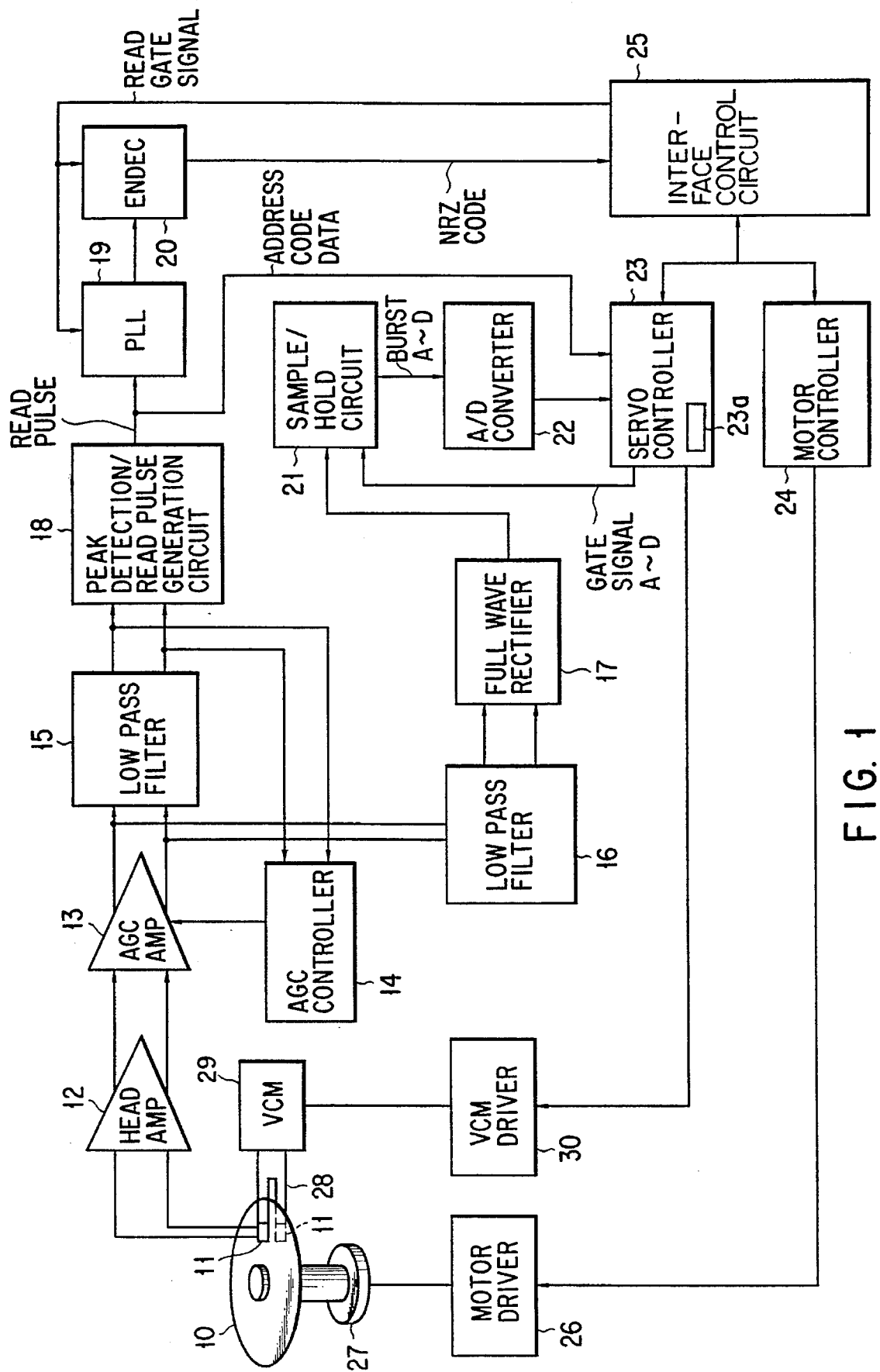
FIG. 1 is a block diagram showing the arrangement of a hard disk drive according to an embodiment of the present invention.

FIG. 1 is a block diagram showing the arrangement of a hard disk drive of a sector servo type according to an embodiment of the present invention. Referring to FIG. 1, the hard disk drive of this embodiment comprises a disk 10 as a magnetic recording medium, a magnetic head 11, a head amplifier 12, an AGC (automatic gain control) amplifier 13, an AGC controller 14, low pass filters 15 and 16, a full wave rectifier 17, a peak detection/read pulse generation circuit 18, a PLL (phase locked loop) 19, an encoder/decoder (ENDEC) 20, a sample/hold circuit 21, an A/D (analog/digital) converter 22, a servo controller 23, a motor controller 24, an interface control circuit 25, a motor driver 26, a spindle motor 27, an actuator 28, a VCM (voice coil motor) 29, and a VCM driver 30.

Figure 2:
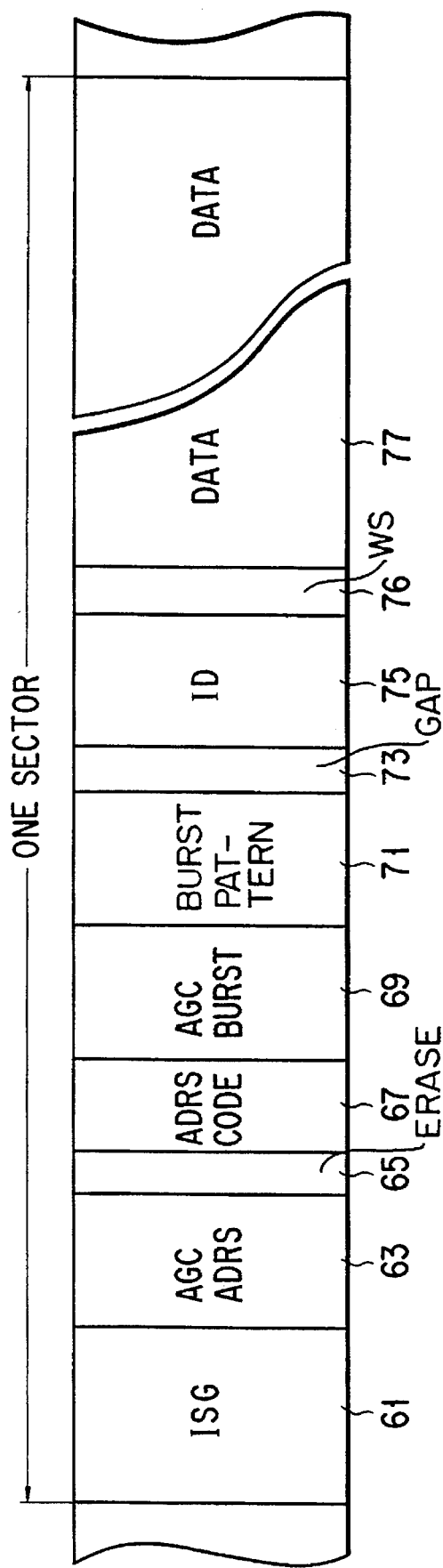
FIG. 2 is a view showing the data format of a disk.

Cylinders, each having a plurality of sectors, are concentrically arranged on the disk 10, and data is recorded in the respective sectors. Each data recorded on the disk 10 includes host data to be read/written by a user, and servo data for positioning the magnetic head to a cylinder. FIG. 2 shows the data format of one sector. Referring to FIG. 2, an intersector gap (ISG) 61 is an area for providing a margin with respect to a deviation from the start position of a sector due to variations in rotation of the spindle motor 27. An AGC address (AGC ADRS) area 63 is an area for adjusting the gain of the AGC amplifier 13 to accurately read out data from an erase (ERASE) area 65 and an address code (ADRS CODE) area 67 which follow the area 63. Note that the contents of read out data are not determined. The erase area 65 indicates the beginning of the address code area 67. In the erase area 65, erase data with no magnetization inverse is recorded. The address code area 67 is an area for recording address code data for identifying a cylinder. An AGC burst (AGC BURST) area 69 is an area for adjusting the gain of the AGC amplifier 13 to accurately read data from a subsequent burst pattern (BURST PATTERN) area 71. The burst pattern area 71 is an area for recording burst data for positioning the magnetic head 11 to the center of a cylinder. A gap (GAP) 73 and a write splice (WS) area 76 are areas for absorbing variations in data write start timings. An identification (ID) area 75 is an area for recording format information of a cylinder and a sector as ID data. A data (DATA) area is an area in which host data is recorded.

Figure 3A:
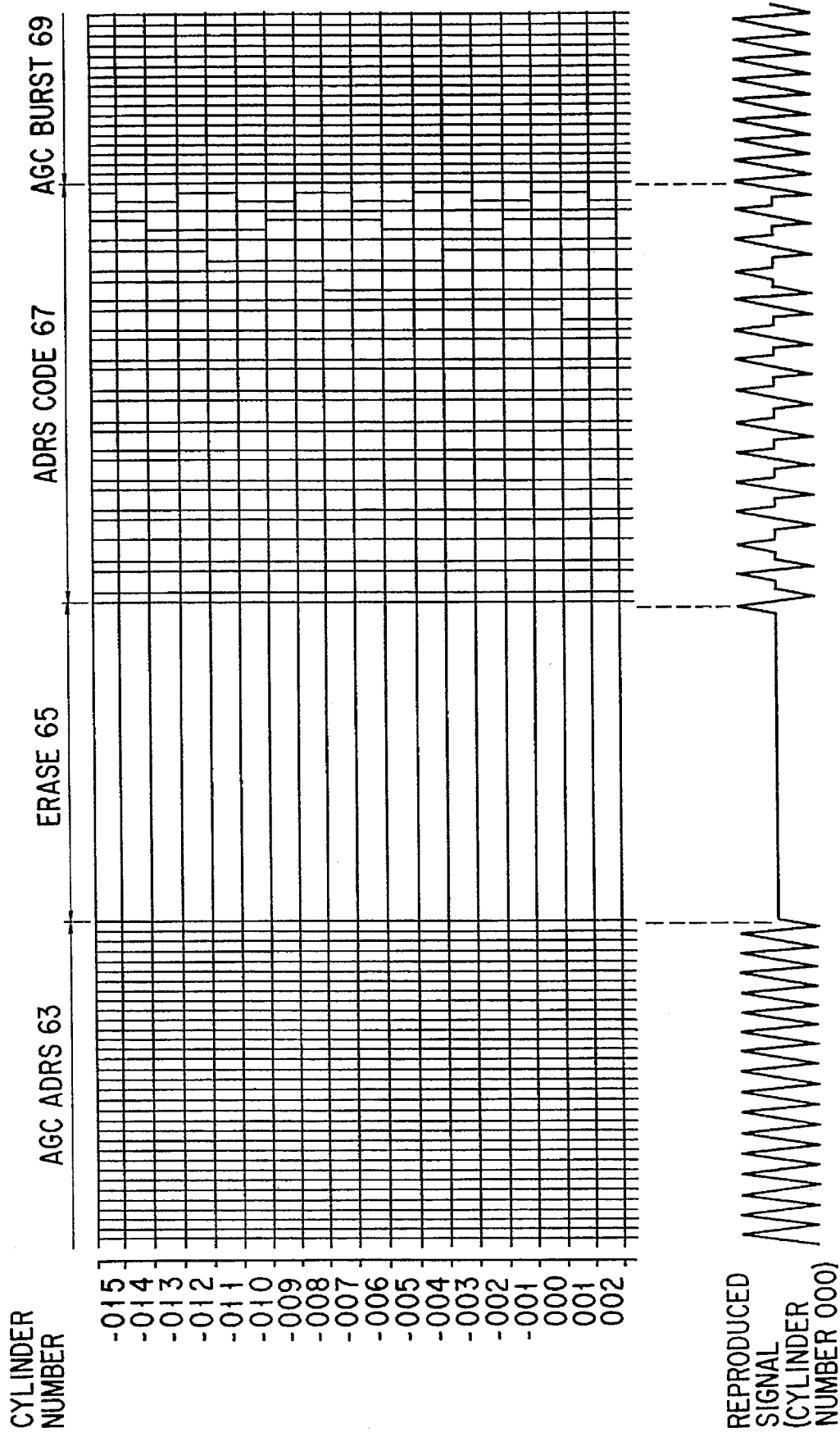
FIGS. 3A and 3B are charts showing main areas of the data format in FIG. 2.
Figure 3B:
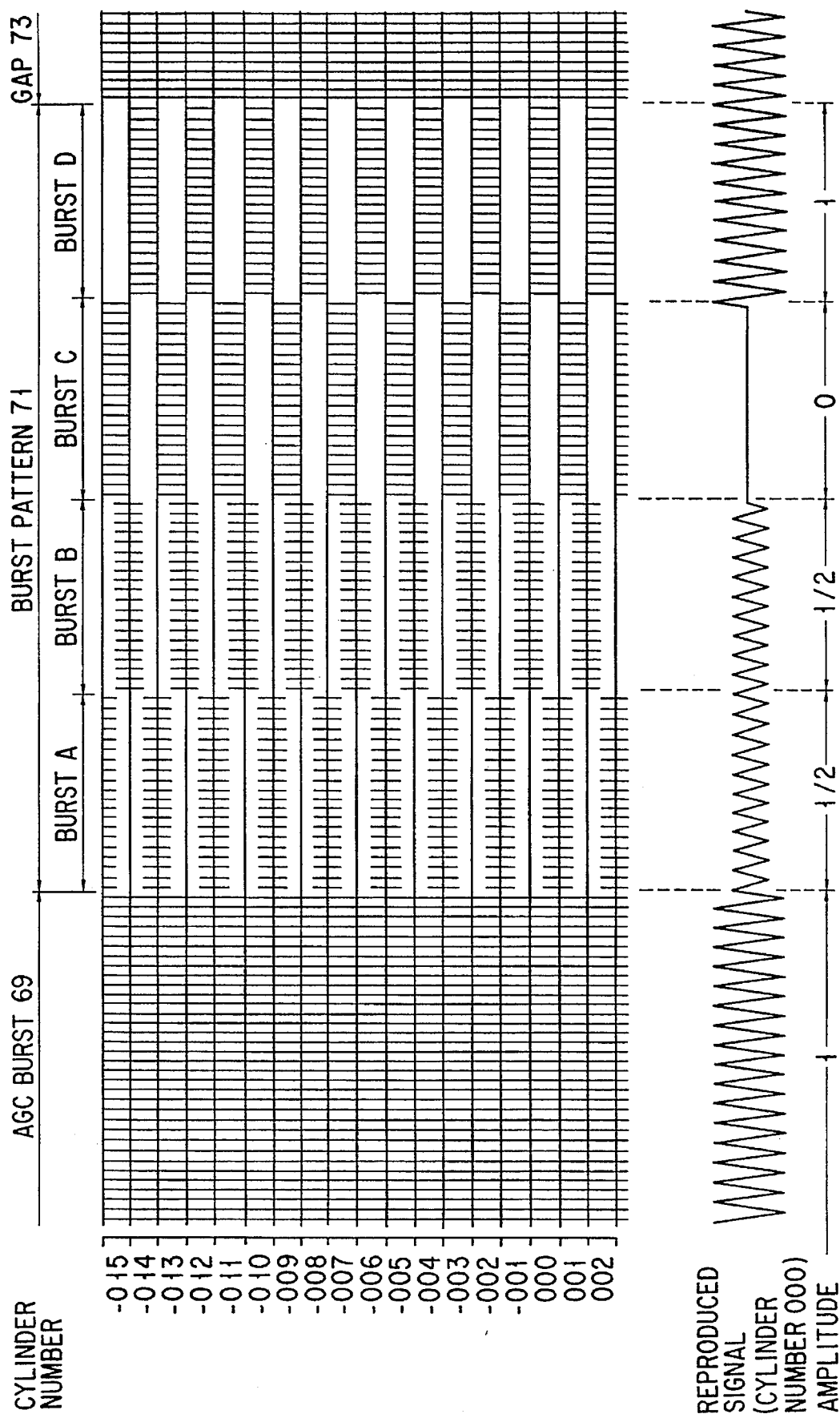

FIGS. 3A and 3B show main areas of the data format in FIG. 2. FIG. 3A shows the AGC address area 63, the erase area 65, the address code area 67, and the AGC burst area 69. Note that the direction of magnetization in each recorded data is not shown. Vertical lines in FIG. 3A represent the magnetization inverse positions of the recorded data. In addition, FIG. 3A shows the waveform of a reproduced signal obtained when the magnetic head is positioned at cylinder number 000.

FIG. 3B shows the AGC burst area 69, the burst pattern area 71, and the gap 73. The burst pattern area 71 has four pattern areas. Bursts A, B, C, and D of burst data are respectively recorded in the four pattern areas. In addition, FIG. 3B shows the waveform of a reproduced signal obtained when the magnetic head is positioned on the cylinder of cylinder number 000, and the amplitude of each reproduced signal in the burst pattern area 71 with the amplitude of a reproduced signal in the AGC burst area 69 assumed to be "1".

Figure 4:
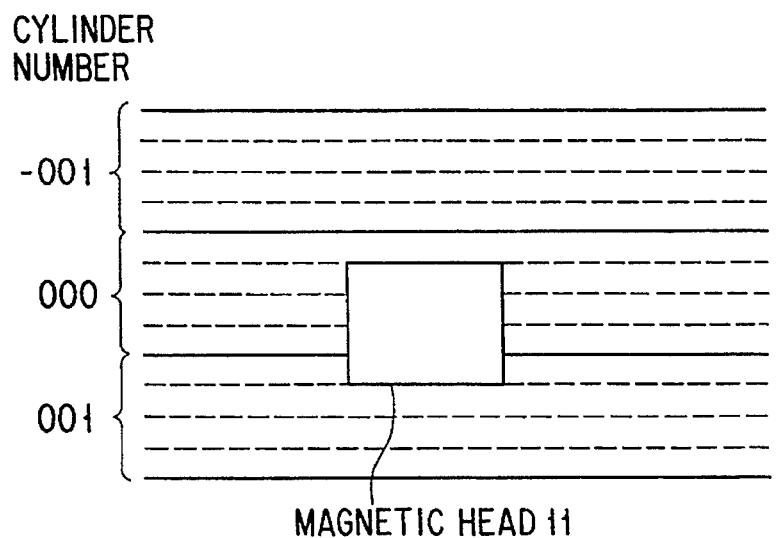
FIG. 4 is a view for explaining the positional shift of a magnetic head from the center of a cylinder.

As is apparent from FIG. 3B, the bursts A, B, C, and D are respectively recorded at positions shifted from each other in the radial direction of the recording medium 10 by an amount corresponding to ½ a cylinder. The amplitude of each of reproduced signals in the bursts A and B is ½; the amplitude of a reproduced signal in the burst C is 0; and the amplitude of a reproduced signal in the burst D is 1. Assume that the magnetic head 11 positioned on the cylinder of cylinder number 000 is shifted to the cylinder of cylinder number 001 by an amount corresponding to ¼ a cylinder, as shown in FIG. 4. In this case, the amplitude of a reproduced signal in the burst A is ¾; the amplitude of each of reproduced signals in the bursts B and C is ¼; and the amplitude of a reproduced signal in the burst D is ¾.

In this manner, the positional shift of the magnetic head from the center of a destination cylinder is detected on the basis of the amplitudes of reproduced signals in the respective bursts, and the magnetic head is positioned to the center of the destination cylinder in accordance with the detected positional shift.

Figure 5A:
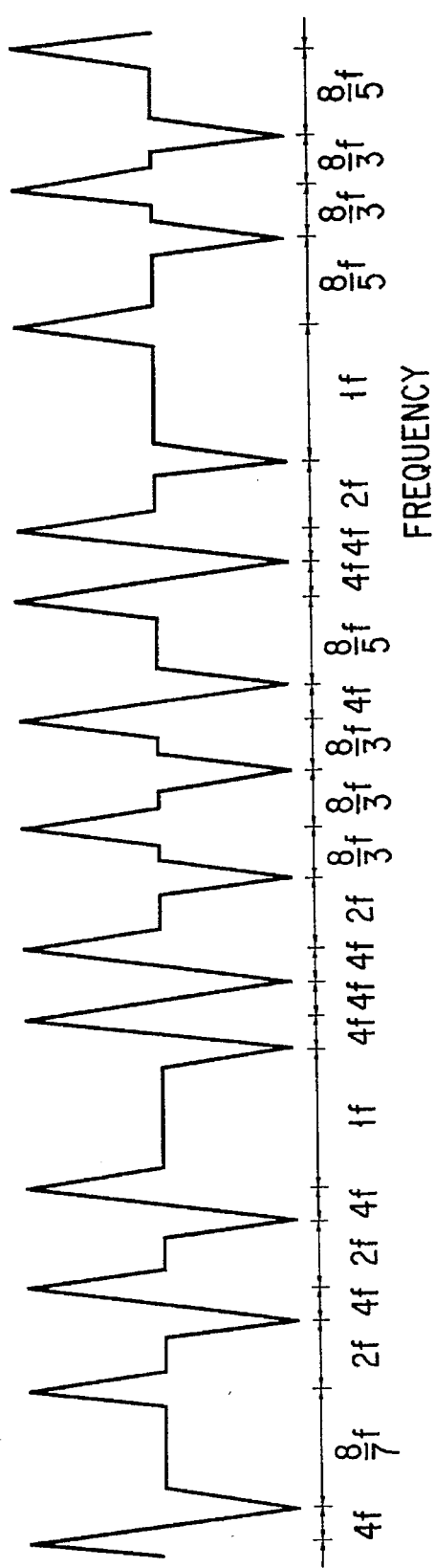
FIGS. 5A and 5B are charts showing a reproduced signal of host data recorded on a data area with its recording frequencies, and a reproduced signal of burst data recorded in a burst pattern area with its recording frequency, respectively.
Figure 5B:
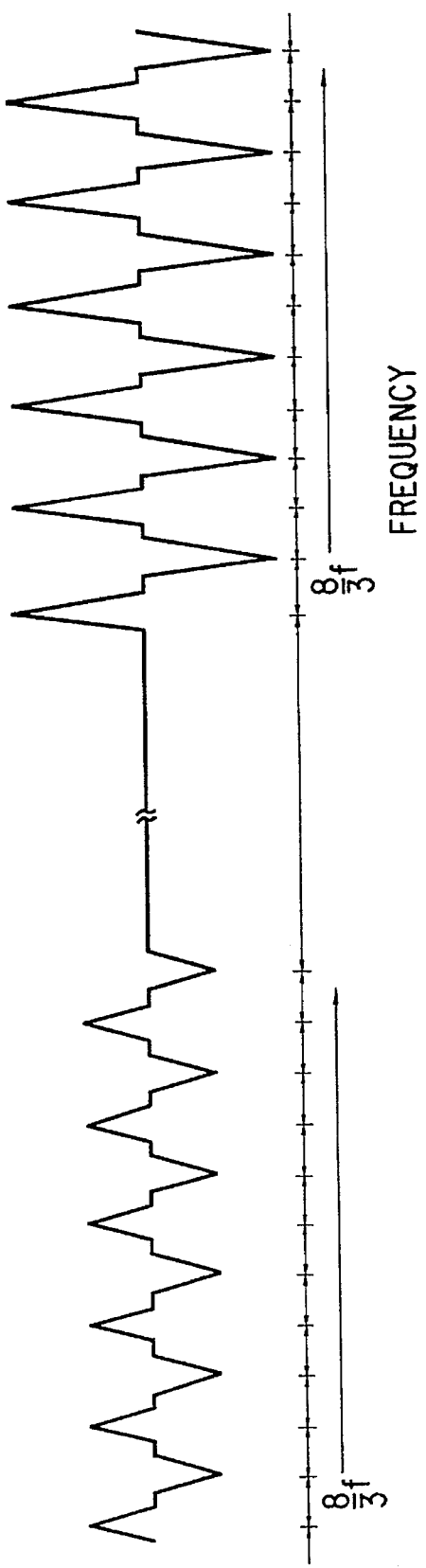

FIGS. 5A and 5B respectively show a reproduced signal of host data recorded in a data area with its recording frequencies, and a reproduced signal of burst data recorded in a burst pattern area with its recording frequency. Referring to FIG. 5A, the recording frequencies for the host data recorded in the data area 77 are within the range of 1 f to 4 f. Note that f corresponds to 1 MHz to several MHz. Referring to FIG. 5B, the recording frequency for the burst data recorded in the burst pattern area 71 has a constant value of ⅔ f.

The magnetic head 11 records/reproduces data on/from the disk 10. The head amplifier 12 amplifies a reproduced signal from the magnetic head 11. The AGC amplifier 13 amplifies the reproduced signal from the head amplifier 12. The AGC controller 14 controls the gain of the AGC amplifier 13 to keep the amplitude of the output signal from the low pass filter 15 constant. This operation is required because reproduced signals obtained from the respective cylinders have different amplitudes.

The low pass filters 15 and 16 perform low pass filtering to remove components other than low-frequency components from the reproduced signal output from the AGC amplifier 13. Note that the filter characteristics of the low pass filter 15 are different from those of the low pass filter 16, to be described below.

Figure 6A:
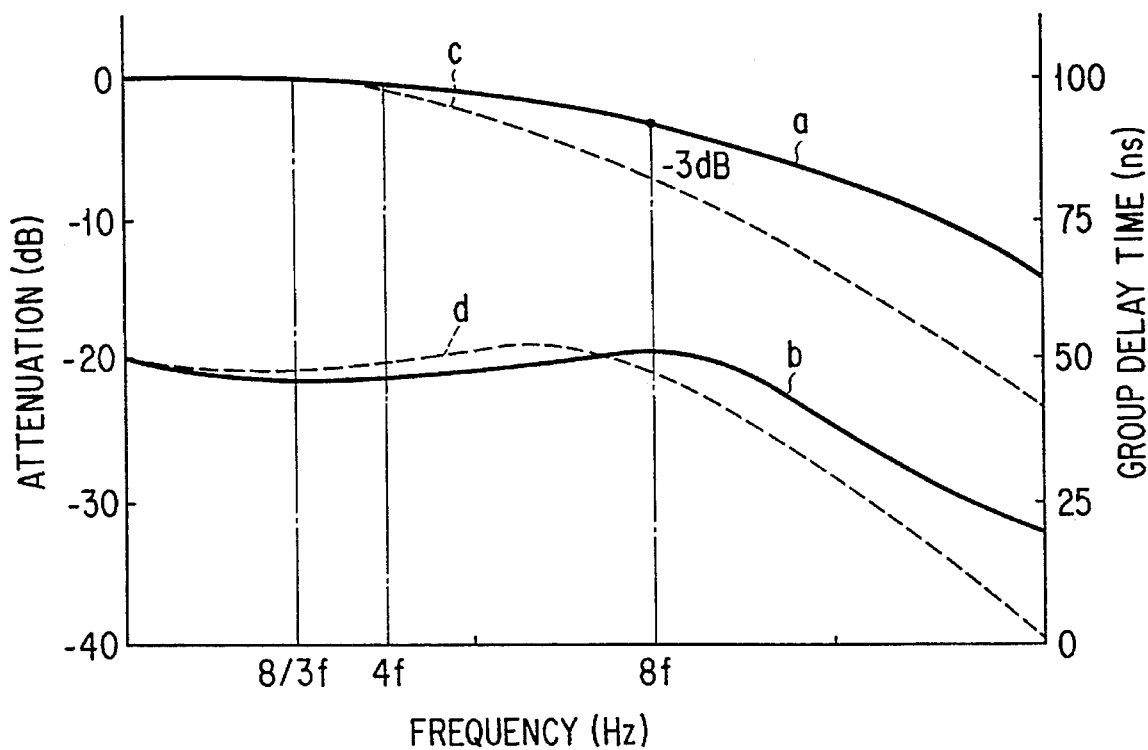
FIGS. 6A to 6C are graphs showing the filter characteristics (attenuation characteristics and group delay characteristics) of low pass filters in the hard disk drive according to the embodiment of the present invention.
Figure 6B:
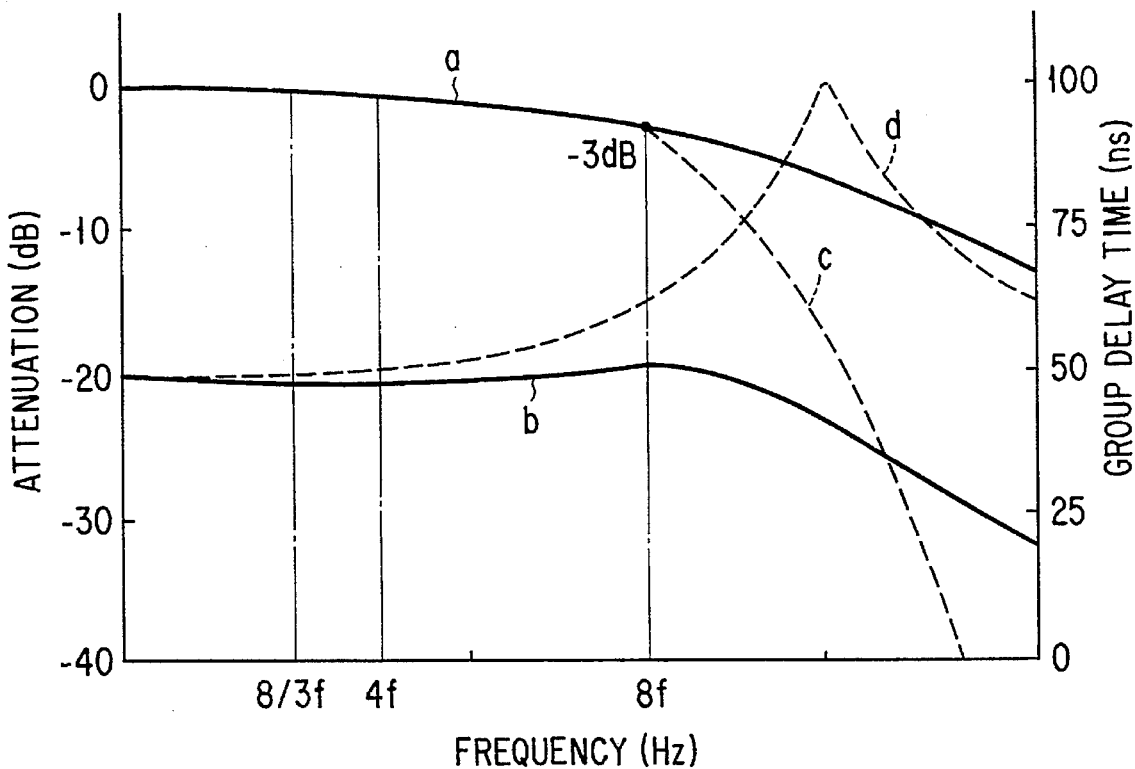
Figure 6C:
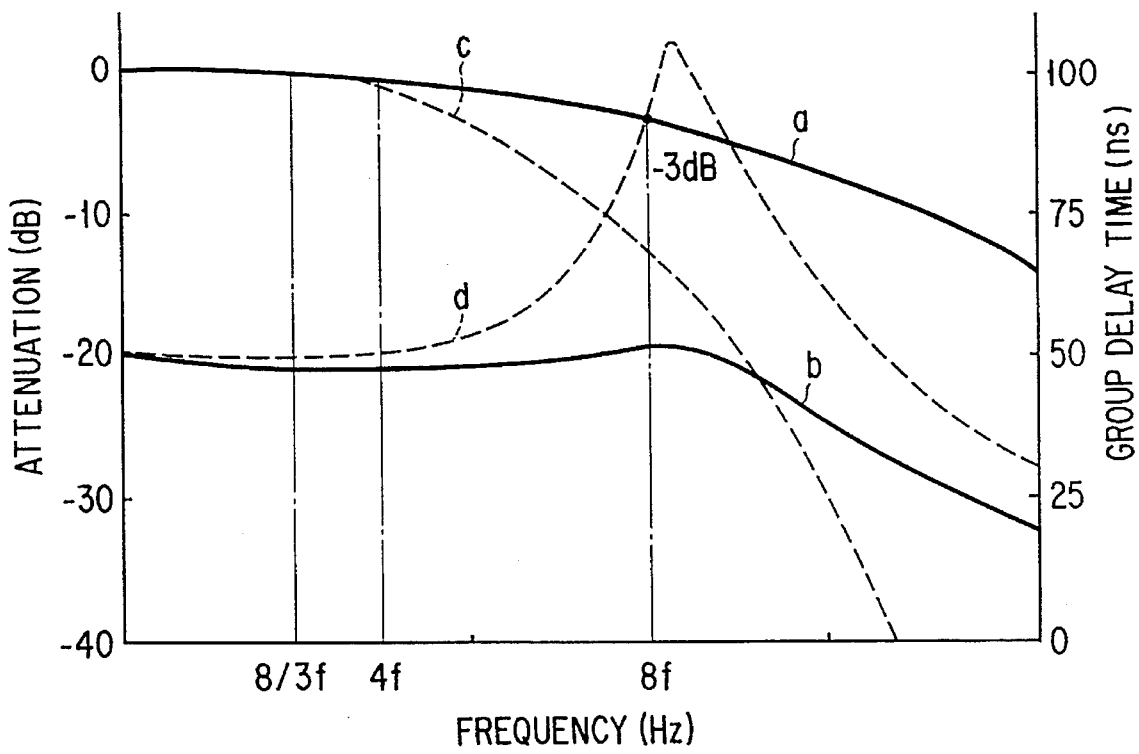

FIGS. 6A to 6C show the filter characteristics (attenuation characteristics and group delay characteristics) of the low pass filters in the embodiment of the present invention. Referring to FIGS. 6A to 6C, reference symbol (a) denotes the attenuation characteristics of the low pass filter 15; (b) denotes the group delay characteristics of the low pass filter 15; (c) denotes the attenuation characteristics of the low pass filter 16; and (d) denotes the group delay characteristics of the low pass filter 16. FIG. 6A shows the filter characteristics of the low pass filters 15 and 16 in a case wherein the two filters have cutoff frequencies 8 f and 4 f, respectively, and the same Q value. The Q value represents the degree of attenuation of frequency components having frequencies higher than the cutoff frequency in a low pass filter. FIG. 6B shows the filter characteristics of the low pass filters 15 and 16 in a case wherein the two filters have the same cutoff frequency 8 f, but the Q value of the low pass filter 16 is larger than that of the low pass filter 15. It is apparent that as the Q value is increased, the degree of attenuation of frequency components having frequencies higher than the cutoff frequency is increased. FIG. 6C shows the filter characteristics of the low pass filters 15 and 16 in a case wherein the two filters respectively have cutoff frequencies 8 f and 4 f, and the Q value of the low pass filter 16 is larger than that of the low pass filter 15.

The low pass filter 15 has the same filter characteristics throughout the cases shown in FIGS. 6A to 6C. With regard to the attenuation characteristics of the low pass filter 15, the degree of attenuation of frequency components having frequencies higher than the cutoff frequency is moderate. With regard to the group delay characteristics, the group delay time is substantially constant within the range of 1 f to 4 f as the recording frequencies for host data. In contrast to this, as is apparent from FIGS. 6A to 6C, the filter characteristics of the low pass filter 16 vary. With regard to the attenuation characteristics, noise is efficiently removed by changing the cutoff frequency and/or the Q value. With regard to the group delay characteristics, as the Q value is increased, the group delay time increasingly varies.

In a conventional hard disk drive, all the data recorded the disk 10 are filtered by one low pass filter. In the embodiment of the present invention, however, burst data are filtered by the low pass filter 16, and data (e.g., host data) other than burst data are filtered by the low pass filter 15.

As described above, therefore, since only one recording frequency ⅔ f is used for burst data, and uniform delay group characteristics are not required, the cutoff frequency of the low pass filter 16 can be set to be close to ⅔ f (4 f in this embodiment), and the Q value can be increased.

The reproduced signal, from which noise is removed by the low pass filter 15, is input to the peak detection/read pulse generation circuit 18. The peak detection/read pulse generation circuit 18 detects the peak position of the reproduced signal and generates a read pulse in accordance with the detected peak position.

The read pulse generated by the peak detection/read pulse generation circuit 18 is output to the PLL 19 and the servo controller 23. The PLL 19 performs phase locking of the reproduced signal in accordance with a read gate signal output from a host computer (not shown) through the interface control circuit 25. The encoder/decoder 20 converts the read pulse from the PLL 19 into an NRZ (non return to zero) code in accordance with the read gate signal, and outputs the NRZ code, as host data, to the interface control circuit 25. The interface control circuit 25 is connected to the servo controller 23, the motor controller 24, and the host computer.

The reproduced signal from the low pass filter 16 is input to the sample/hold circuit 21 through the full wave rectifier 17. The sample/hold circuit 21 samples/holds the reproduced signal to detect its amplitude, thus acquiring burst data (bursts A, B, C, and D) for positioning the magnetic head 11 to the center of the destination cylinder of the disk 10. The acquired burst data (bursts A, B, C, and D) are converted into digital data by the A/D converter 22. The digital data is then supplied to the servo controller 23. Address code data and the like contained in the read pulse generated by the peak detection/read pulse generation circuit 18 are supplied to the servo controller 23. The servo controller 23 controls the VCM driver 30 on the basis of the bursts A, B, C, and D and the address code data, thus executing positioning control for the magnetic head 11.

The VCM driver 30 drives the VCM 29. When the VCM 29 is driven, the actuator 28 for supporting the magnetic head 11 is moved over the disk 10.

The motor controller 24 controls the motor driver 26. The motor driver 26 drives the spindle motor 27 under the control of the motor controller 24. With this operation, the disk 10 is rotated.

Figure 7:
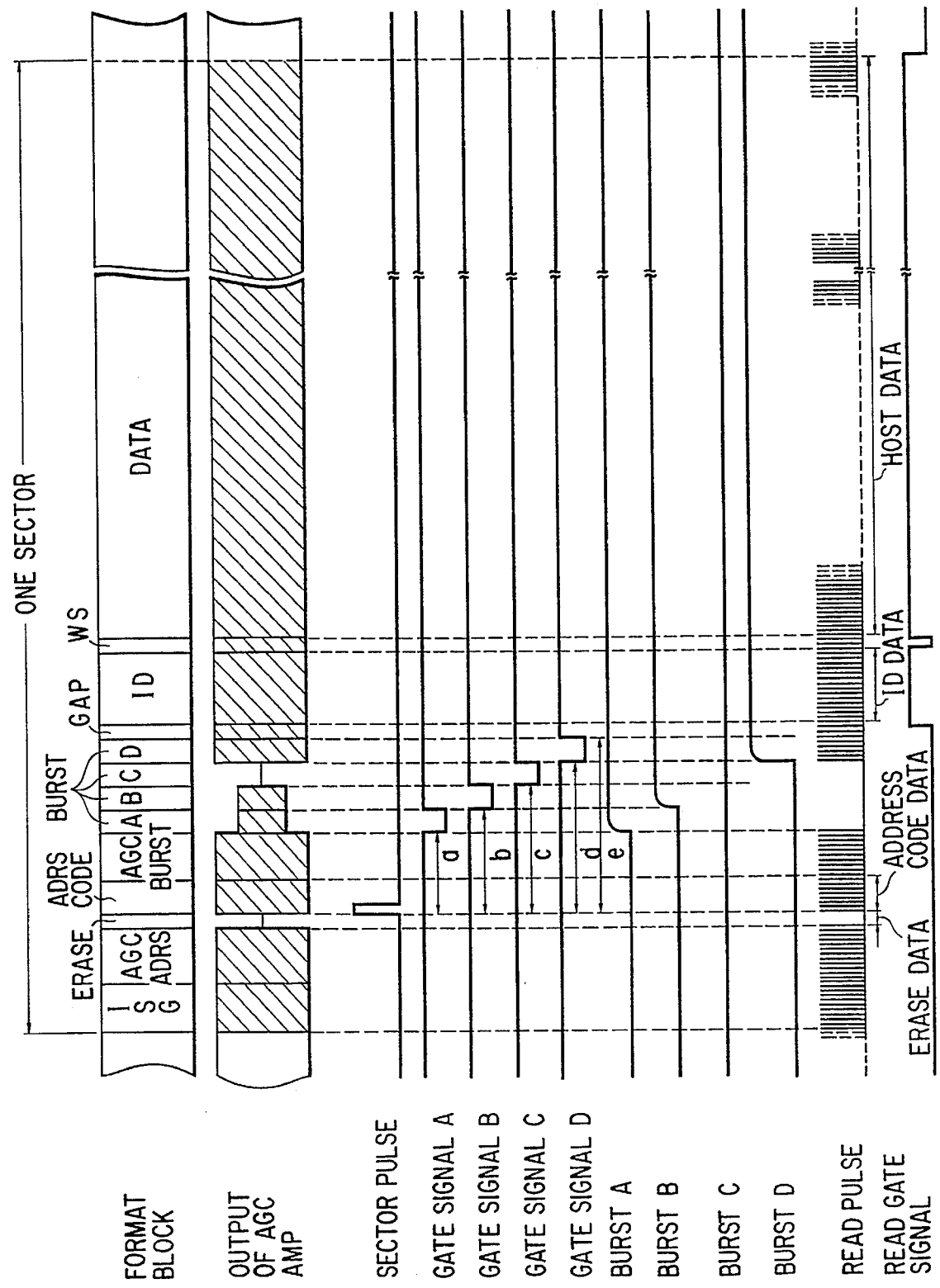
FIG. 7 is a timing chart showing the acquisition timings of burst data and read pulses in the magnetic disk apparatus according to the embodiment of the present invention.

An operation of the hard disk drive of the embodiment will be described below with reference to FIG. 7. FIG. 7 shows the acquisition timings of burst data and read pulses in the hard disk drive of the embodiment. As described above, according to the embodiment, the two filters 15 and 16 having different filter characteristics are used.

When the hard disk drive is started, the motor controller 24 controls the motor driver 26 to drive the spindle motor 27. As a result, the disk 10 starts rotation at a predetermined rotational speed. The motor controller 24 controls the motor driver 26. When a destination cylinder is determined, the magnetic head 10 is moved to the destination cylinder by the actuator 28. During the movement of the magnetic head 10, data recorded on the disk 10 is detected as a reproduced signal by the magnetic head 11. The detected signal is amplified by the head amplifier 12 and the AGC amplifier 13 and is subsequently supplied to the low pass filters 15 and 16.

If erase data are continuously acquired for a predetermined period of time on the basis of the reproduced signal from the magnetic head 11, the servo controller 23 determines that the erase area 65 is detected, and generates address code data (as a sector pulse) corresponding to the first one bit to be recorded in the address code area 67 subsequent to the erase area 65. After this sector pulse is generated, the reproduced signal supplied from the low pass filter 15 to the peak detection/read pulse generation circuit 18 is output, as a read pulse, to the PLL 19 and the servo controller 23.

At the same time that the sector pulse is generated, the servo controller 23 starts a timer 23a to measure times a, b, c, d, and e. In time intervals a–b, b–c, c–d, and d–e, gate signals A, B, C, and D are respectively output to the sample/hold circuit 21. The reproduced signals supplied to the sample/hold circuit 21 through the full wave rectifier 17 are respectively sampled/held at the timings of these gate signals, and are supplied, as the bursts A, B, C, and D, to the servo controller 23 through the A/D converter 22. Note that the sample/hold circuit 21 operates when a gate signal is set at high level.

The read pulse generated by the peak detection/read pulse generation circuit 18 is supplied, as address code data, to the servo controller 23. The servo controller 23 controls the VCM driver 30 on the basis of the bursts A, B, C, and D and the address code data. The VCM driver 30 drives the VCM 29 under the control of the servo controller 23. When the VCM 29 is driven, the actuator 28 for supporting the magnetic head 11 is moved over the disk 10.

As described above, in the conventional hard disk drive, the read pulse and the bursts A, B, C, and D are obtained on the basis of the reproduced signal output from one low pass filter. In the embodiment, however, since the two low pass filters 15 and 16 are used, and the filter characteristics of the low pass filter 16 are set in accordance with a recording frequency for burst data, detection errors caused by noise during a sample/hold operation of the sample/hold circuit 21 are reduced, and more accurate burst data can be obtained.

In a data read operation executed in response to a command from the host computer, the peak position of each reproduced signal from which noise is removed by the low pass filter 15 is detected by the peak detection/read pulse generation circuit 18, and a read pulse is generated in accordance with the detected peak position to supply the read pulse to the PLL 19 and the servo controller 23. The read pulse supplied to the PLL 19 is phase-locked in accordance with a read gate signal output from the host computer through the interface control circuit 25. The phase-locked read pulse is converted into an NRZ code by the encoder/decoder 20 in response to a read gate signal. This NRZ code is then output, as host data, to the host computer through the interface control circuit 25. Note that the PLL 19 and the encoder/decoder 20 are designed to operate only when a read gate signal is set at high level.

As is apparent from FIGS. 1 and 7, during detection of the bursts A, B, C, and D, and of read pulses, signals output from the AGC amplifier 13 are always supplied to the low pass filters 15 and 16. In positioning control for the magnetic head 11, the servo controller 23 recognizes these signals as a function of time, and acquires the signals at predetermined timings.

In host data, it is required that the group delay characteristics are uniform. This is because, as described above, host data includes frequency components of a wide band (FIG. 5A). If, therefore, the group delay characteristic vary, and the group delay time is long, a peak shift tends to occur. In this embodiment, although host data is obtained on the basis of an output signal from the low pass filter 15, since the group delay characteristics of the low pass filter 15 are uniform at recording frequencies of 1 f to 4 f for host data, as shown in FIGS. 6A to 6C, occurrence of a peak shift is prevented.

In burst data, it is required that the amplitude of a reproduced signal is accurately detected. This is because, as described above, if high-frequency noise is contained in this reproduced signal, a positional shift of the magnetic head is erroneously detected. The low pass filter 16 has three types of characteristics as filter characteristics based on combinations of cutoff frequencies and the Q values, as shown in FIGS. 6A to 6C. Since each type of characteristics of the low pass filter 16 has a high degree of attenuation of signal components as compared with the characteristics of the filter 15, high-frequency noise contained in a reproduced signal can be removed. Note that if the degree of attenuation of signal components is increased by increasing the Q value, the group delay characteristics greatly vary, but a peak shift is not easily caused by the variations in group delay characteristics because burst data has only a predetermined frequency (⅔ f), as shown in FIGS. 6A and 6B.

As has been described above, in the sector servo type, a peak shift in host data can be prevented by using low pass filters having different filter characteristics. In addition, an accurate positional shift of the magnetic head can be obtained by accurately detecting the amplitude of burst data, thereby improving precision in positioning of the magnetic head with respect to a destination cylinder.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A magnetic recording and reproducing apparatus, comprising:

a recording medium on which information including host data and servo data is recorded, the servo data including burst data;

a head for reading out a single reproduced signal corresponding to the information recorded at a single depth on the recording medium;

first filter means to which the single reproduced signal read out by the head is input, for filtering a portion of the single reproduced signal corresponding to the host data and the portion of the servo data without burst data, the first filter means having uniform group delay characteristics within a predetermined frequency range, and attenuation characteristics, for attenuating frequency components having frequencies higher than a predetermined frequency;

second filter means to which the single reproduced signal read out by the head is input, for filtering a portion of the reproduced signal corresponding to the burst data, the second filter means having attenuation characteristics representing a higher degree of attenuation than the attenuation characteristics of the first filter means;

means for detecting a peak position of the portion of the reproduced signal filtered by the first filter means; and means for detecting an amplitude of the portion of the reproduced signal filtered by the second filter means.

2. A magnetic recording and reproducing apparatus according to claim 1, wherein the host data is recorded on the recording medium at a plurality of recording frequencies within the predetermined frequency range, the burst data is recorded on the recording medium at a constant recording frequencies.

3. A magnetic recording and reproducing apparatus according to claim 1, wherein a cutoff frequency of the first filter means is higher than that of the second filter means.

4. A magnetic recording and reproducing apparatus according to claim 1, wherein a Q value of the second filter means is larger than that of the first filter means.

5. A magnetic recording and reproducing apparatus according to claim 1, wherein a cutoff frequency of the first filter means is higher than that of the second filter means, and a Q value of the second filter means is larger than that of the first filter means.

6. A method of positioning of a magnetic head in a magnetic recording and reproducing apparatus, the method comprising the steps of:

reading out a single reproduced signal from a recording medium on which host data and servo data are recorded at a single depth, the servo data including burst data;

inputting the single reproduced signal to a first filter means and a second filter means;

filtering a portion of the reproduced signal corresponding to the host data and the portion of the servo data without the burst data by using the first filter means having uniform group delay characteristics within a predetermined frequency range and attenuation characteristics for attenuating frequency components having frequencies higher than a predetermined frequency and uniform group delay characteristics within a predetermined frequency range;

filtering a portion of the reproduced signal corresponding to the burst data by using the second filter means having attenuation characteristics representing a higher degree of attenuation than the attenuation characteristics of the first filter means;

detecting a peak position of the portion of the reproduced signal filtered by the first filter means; and detecting an amplitude of the portion of the reproduced signal filtered by the second filter means.

7. A method according to claim 6, wherein the host data is acquired by detecting a peak position of the reproduced signal filtered by the second filter.

8. A method according to claim 6, wherein the host data is recorded on the recording medium at a plurality of recording frequencies within the predetermined frequency range, and the burst data is recorded on the recording medium at a predetermined recording frequency.

9. A method according to claim 6, wherein a cutoff frequency of the second filter is higher than that of the first filter.

10. A method according to claim 6, wherein a Q value of the first filter is larger than that of the second filter.

11. A method according to claim 6, wherein a cutoff frequency of the second filter is higher than that of the first filter, and a Q value of the first filter is larger than that of the second filter.

12. A magnetic recording and reproducing apparatus, comprising:

a recording medium on which information including host data and servo data is recorded at a single depth, the servo data including burst data;

a head for reading out a single reproduced signal corresponding to the information recorded on the recording medium;

amplifier means for amplifying the reproduced signal read out by the head means;

first filter means to which the single reproduced signal read out by the head is input, for filtering a portion of the reproduced signal, corresponding to the host data and the portion of the servo data without the burst data, from the amplifier means, the first filter means having uniform group delay characteristics within a predetermined frequency range, and attenuation characteristics for attenuating frequency components having frequencies higher than a predetermined frequency;

second filter means to which the single reproduced signal read out by the head is input, for filtering a portion of the reproduced signal, corresponding to the burst data, from the amplifier, the second filter means having attenuation characteristics representing a higher degree of attenuation than the attenuation characteristics of the first filter means;

burst data generating means for detecting an amplitude of the portion of the reproduced signal filtered by the second filter means and for generating the burst data used for positioning the head means at a center of a destination cylinder of the recording medium; and means for positioning the head means over the predetermined position on the medium, in accordance with the burst data from the burst data generating means.

* * * * *